United States Patent
Sotack

(10) Patent No.: US 7,844,248 B2
(45) Date of Patent: Nov. 30, 2010

(54) DETECTION OF WHETHER A USER IS IN PERIL AND SITUATIONAL AWARENESS ENHANCEMENT

(75) Inventor: John Sotack, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 790 days.

(21) Appl. No.: 11/502,963

(22) Filed: Aug. 11, 2006

(65) Prior Publication Data

US 2008/0037433 A1 Feb. 14, 2008

(51) Int. Cl.
*H04M 11/04* (2006.01)
*H04M 1/00* (2006.01)
*G01S 3/80* (2006.01)
*B60Q 1/00* (2006.01)

(52) U.S. Cl. .................. 455/404.1; 455/563; 455/550.1; 367/124; 367/118; 340/425.5

(58) Field of Classification Search .............. 455/404.1, 455/563, 550.1; 367/118, 124; 340/425.5
See application file for complete search history.

(56) References Cited

U.S. PATENT DOCUMENTS

| 5,973,998 | A | 10/1999 | Showen et al. |
| 6,275,712 | B1 * | 8/2001 | Gray et al. ................... 455/522 |
| 6,847,587 | B2 | 1/2005 | Patterson et al. |
| 2004/0100868 | A1 * | 5/2004 | Patterson et al. ............. 367/127 |
| 2005/0085257 | A1 * | 4/2005 | Laird et al. ............... 455/550.1 |
| 2007/0194893 | A1 * | 8/2007 | Deyoe .......................... 340/436 |

* cited by examiner

*Primary Examiner*—Nick Corsaro
*Assistant Examiner*—Manpreet S Matharu
(74) *Attorney, Agent, or Firm*—Harness, Dickey & Pierce, PLC

(57) ABSTRACT

A method for determining whether a user having a communications device has encountered a perilous situation includes detecting a sound with the communications device and determining whether the sound is indicative of the perilous situation. The method generates a query with the communications device for the user when the sound is determined to be indicative of the perilous situation and waits for a response from the user via the communications device. The response or lack thereof is capable of confirming the perilous situation or a false alarm.

20 Claims, 6 Drawing Sheets

DETECTION OF WHETHER A USER IS IN PERIL AND SITUATIONAL AWARENESS ENHANCEMENT

FIELD

The present teachings relate to a method and a related device to monitor changes in a status of a situation and more particularly relate to the detection of whether one or more users have encountered a perilous situation.

BACKGROUND

Many occupations in society can require responding to emergent and dangerous situations. In such situations, communication of all forms of information can become paramount in responding successfully.

In one example, a dedicated array of sensors is fixed to various structures in an urban environment. Using triangulation, information gathered from the dedicated and fixed array of sensors provide an estimate of a position of a gunshot. The information is reported to a dispatcher. While the above example is useful for its intended purpose, there remains room in the art for improvement.

SUMMARY

The present teachings generally include a method for determining whether a user having a communications device has encountered a perilous situation. The method includes detecting a sound with the communications device and determining whether the sound is indicative of the perilous situation. The method generates a query with the communications device for the user when the sound is determined to be indicative of the perilous situation and waits for a response from the user via the communications device. The response or lack thereof is capable of confirming the perilous situation or a false alarm.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

Figure 1:
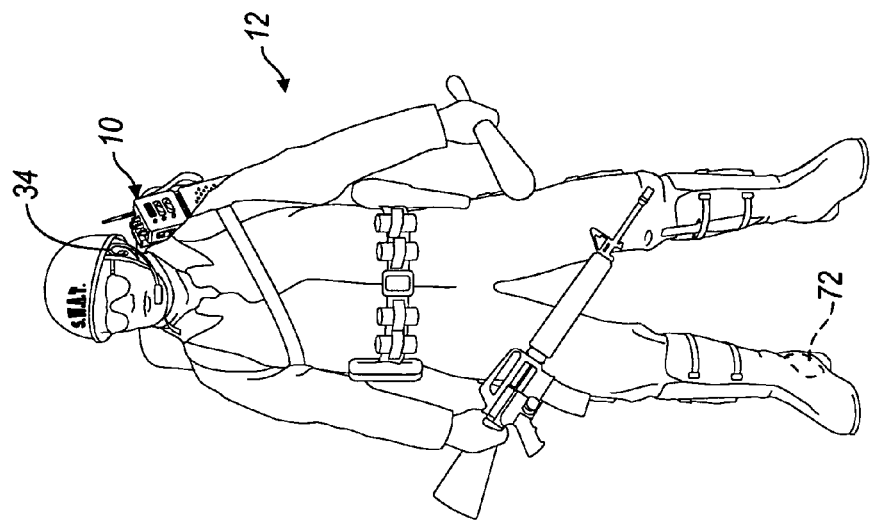
FIG. 1 is a perspective view of an exemplary communications device in accordance with the present teachings that determines whether a user of the communications device is in a perilous situation.

The following description is merely exemplary in nature and is not intended to limit the present teachings, their application, or uses. It should be understood that throughout the drawings, corresponding reference numerals can indicate like or corresponding parts and features.

Figure 2:
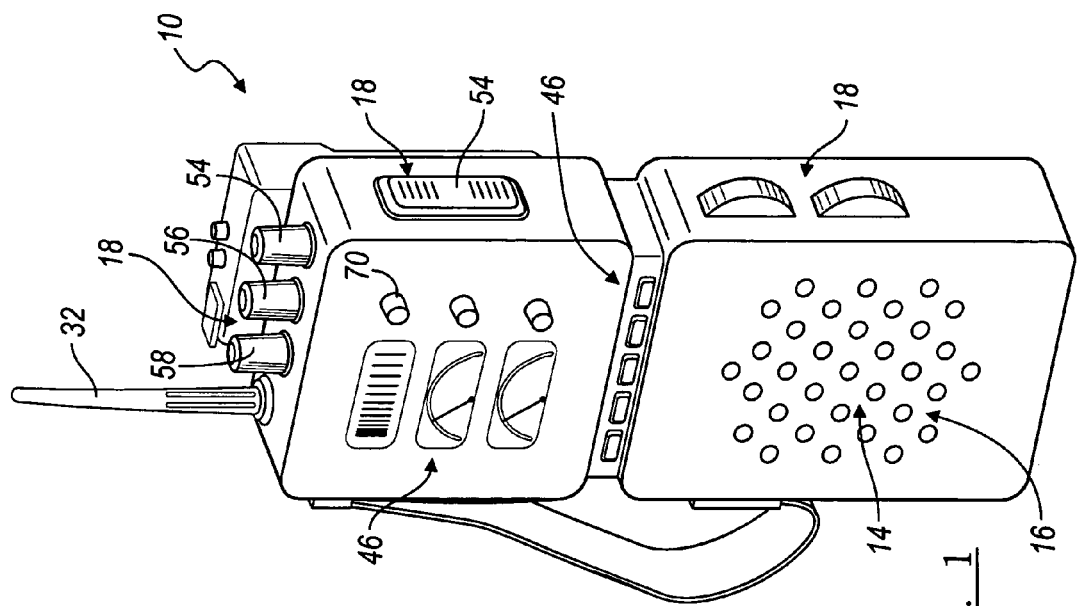
FIG. 2 is an exemplary user of the communications device of FIG. 1.

With reference to FIGS. 1 and 2, the present teachings generally include a communications device 10 that determines whether a user 12 of the device has encountered a perilous situation. The determination of whether the user has encountered the perilous situation includes detection of sounds indicative of nearby explosions consistent with rifle fire, repeating gunfire, mortar fire, incoming shells, explosions of improvised external devices, rocket propelled grenades, landmines, the user falling through a floor, etc.

The communications device 10 includes a speaker 14 and a microphone 16. The speaker 14 and the microphone 16 can be activated (or deactivated) by the user 12 to send and/or receive communications by activating user controls 18 on the communications device 10. The microphone 16 can remain continuously active to constantly listen for sounds.

Figure 3:
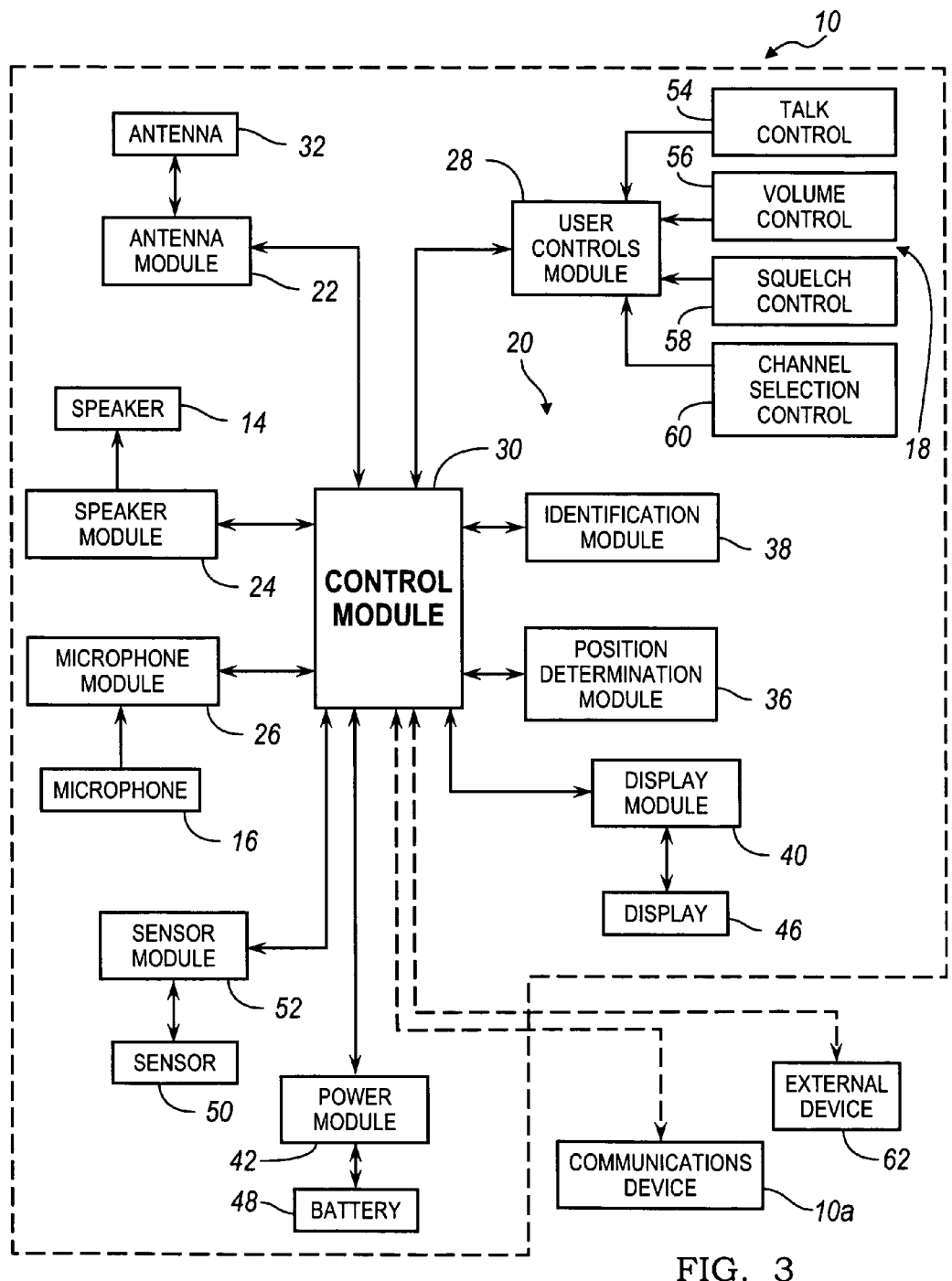
FIG. 3 is a block diagram of an exemplary communications device in accordance with the present teachings.

With reference to FIG. 3, the communications device 10 includes one or more modules 20 that can provide (alone or in combination) a myriad of functionality to the communications device 10. The modules 20 of the communications device 10 includes, for example, an antenna module 22, a speaker module 24, a microphone module 26 and/or a user controls module 28. In addition, one of the modules 20 can be a control module 30 that controls one or more suitable combinations of the modules 20 and/or facilitates communication therebetween.

Figure 4:
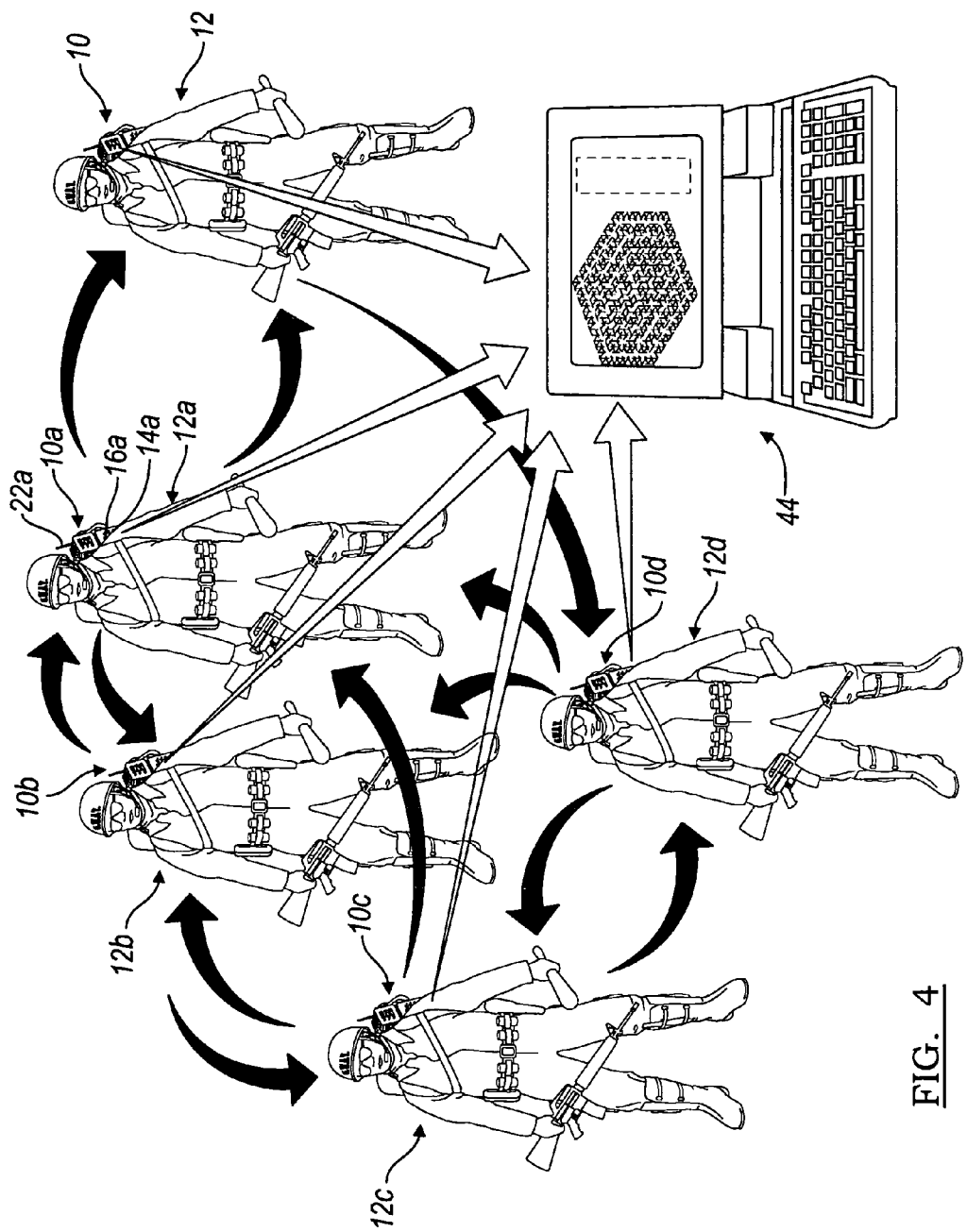
FIG. 4 is a diagram of a server based situational awareness system and of multiple users each having communications devices, all of which may communicate with each other in various combinations depending on the implementation.

With reference to FIG. 4, it will be appreciated that when a plurality of communications devices 10a, 10b, 10c, 10d, etc. are used in accordance with various aspects of the present teachings, the modules and/or components of one device (e.g., the communications device 10) may connect to other suitable modules and/or the components of other devices (e.g., the communications 10a). As stated herein, the communications device 10a, and its modules and components, can, when applicable, define multiple communications devices 10a, 10b, 10c, 10d, etc. (hereinafter referred to as the communications device 10a, etc.) which can be used by users 12a, 12b, 12c, 12d, etc., respectively, (hereinafter referred to as the users 12a, etc.) and suitable combinations thereof.

With reference to FIG. 3, the antenna module 22 includes an antenna 32 electrically connected to the antenna module 22. The antenna module 22 can also connect to additional antennas, an external device 62, e.g., an external antenna, an antenna 32a (FIG. 4) mounted on the other communications devices 10a, etc. and suitable combinations thereof.

The speaker module 24 connects to the speaker 14 (FIG. 1). The speaker module 24 can also connect to additional speakers, the external device 62, e.g., an external speaker, a user's earpiece 34 (FIG. 1), a speaker 14a (FIG. 4) of the other communications device 10a, etc. and suitable combinations thereof.

The microphone module 26 connects to the microphone 16 (FIG. 1). The microphone module 26 can also connect to additional microphones, the external device 62, e.g., an external microphone, the user's earpiece 34, a microphone 16a (FIG. 4) of the other communications devices 10a, etc. and combinations thereof. Regardless of the device to which the microphone module 26 connects, the microphone module 26 can continuously receive a signal from the device.

The communication device 10 further includes a position determination module 36, an identification module 38, a display module 40 and a power module 42. The position determination module 36 determines position information that includes a position of the communications device 10. The position determination module 36 determines the position information by, for example, receiving information from a suitable global positioning system. The position determination module 36 can also determine the position information by sending and/or receiving signals from a situational awareness system 44 (e.g., time of arrival measurements) or from the other communications device 10a, etc. with known positions and coordinated system clocks.

The identification module 38 includes unique identifier data that is resident in the identification module 38 or other suitable modules 20. The unique identifier data includes, for example, a serial number, a media access control (MAC) address, an equipment number, other suitable string of data and/or combinations thereof. In one example, the unique identifier data is contained on memory (e.g., flash or read-only memory) that is shared by other modules 20 and not necessarily contained in the identification module 38.

The display module 40 is connected to a display 46 on the communications device 10 visible to the user 12. The display 46 provides images and/or alphanumeric information useful to the user 12. The display 46 includes, for example, one or more screens (e.g., a liquid crystal display) and/or one or lights (e.g., light emitting diodes), each of which can be associated with certain functions (e.g., power on/off). Useful information includes, for example, position of the communications device 10, battery level, talk on, talk off, system status, etc. The useful information that can otherwise be displayed on the display 46 can also be sent to the other communications devices 10a, etc. and/or the situational awareness system 44.

The power module 42 controls and/or regulates power use of the various modules 20 of the communications device 10. The power module 42 connects to one or more internal batteries 48 and/or to external power sources to provide power to the communications device 10. The power module 42 can determine the remaining amount of power available from the batteries 48.

In a further aspect of the present teachings, the communications device 10 optionally includes a sensor 50 connected to a sensor module 52. The sensor 50 determines an outside air temperature, an outside humidity, an outside air pressure and/or combinations thereof. Based on the information detected from the sensor 50, the communications device 10 can correct the various determinations based on the sounds detected by the device 10. In one example, the communications device 10 adjusts various qualitative sound determinations based on the ambient air pressure because sound pressure levers vary with air density. Changes in humidity and/or air temperature can also be incorporated in other calculations. Information from the sensor 50 can also be transmitted to the other communications devices 10a, etc. and/or the situational awareness system 44 to, for example, track ambient conditions experienced by many communications devices. In another example, the sensor 50 monitors temperature and can determine the presence of fire.

The user controls module 28 connects to a talk control 54, a volume control 56, a squelch control 58 and/or a channel selection control 60. The talk control 54 is a switch to choose between a talk on condition and a talk off condition. With the talk control 54 in the talk on condition, the talk control 54 permits the communications device 10 to transmit, among other things, communication by the user. With the talk control 54 in the talk off condition, the communications device 10 does not transmit but receives transmissions. It will be appreciated that the communications device 10 can be configured to constantly detect sound regardless of or independent of the talk control 54.

It will be appreciated that in the above example, the communications device 10 is a half duplex system, such that, the user must press or activate the talk control 54 (i.e., switch to the talk on condition) to transmit and must release the talk control 54 (i.e., switch to the talk off condition) to receive transmissions. In other examples, the half duplex system incorporates voice activation. In further examples, the communications device is a full duplex system that can, for example, use a cellular communications system.

The volume control 56 adjusts the volume of the speaker 14. The squelch control 58 can adjust the level at which the speaker 14 broadcasts what is received by the communications device 10 or otherwise does not broadcast what is received because the signal strength is below the squelch level, (e.g., signal level below the noise level). The channel selection control 60 allows the user 12 to select channels on which the communications device 10 transmits and/or receives.

In other aspects of the present teachings, two or more of the modules 20 are combined into a single module (e.g., a single multi-function module possibly having multiple submodules), separated into multiple modules communicating between one another and/or combinations thereof. Furthermore, the communications device 10 includes more (or less) modules 20 as required to provide desired functionality. Further yet, various modules 20, the microphone 16 and/or the speaker 14 are activated (or deactivated) or otherwise accessed remotely.

As used herein, the term module, control module, component and/or device refers to one or more of an application specific integrated circuit (ASIC), an electronic circuit, a processor (shared, dedicated, or group) and memory that executes one or more software or firmware programs, a combinational logic circuit, and/or other suitable mechanical, electrical, or electro-mechanical components that provide the described functionality. Moreover, the modules may communicate with the other modules, devices, components, etc. using digital and/or analog inputs and outputs and/or a suitable communications network via a wired and/or wireless connection. The wireless connection can use one or more forms of electromagnetic wave communication.

In operation, the communications device 10 detects whether the user 12 of the communications device 10 is in the perilous situation. To do so, the communications device 10 listens for a sound. The microphone 16 can continuously (or at various predetermined intervals) listen for the sound. As such, the microphone 16 need not be activated by the talk control 54. In this regard, the control module 30 and/or the microphone module 26 constantly receive a signal from the microphone 16. Unlike a typical radio, the microphone 16 need not be activated, as the microphone 16 (unless deactivated) constantly listens for sound. Once the sound is detected, the communications device 10 begins to determine whether the sound is perilous to the user 12.

To determine whether the detected sound is perilous to the user 12, the communications device determines whether the detected sound is indicative of the perilous situation. To determine whether the sound is indicative of the perilous situation, the communications device makes one or more determinations based on the characteristics of the sound and matches those determined characteristics with threshold characteristics. Based on the matching or the comparison, the communications device can continue to determine whether the sound is truly indicative of the perilous situation.

In one example, the communications device 10 determines whether a value of an intensity of the detected sound is greater than an intensity threshold value to determine whether the detected sound is perilous to the user 12. The intensity threshold may correlate with one or more known intensity levels of the sounds that can be produced in one or more perilous situations. For example, the sound may be a gunshot that is nearby the communications device 10. The value of the intensity level of the gunshot within, for example, a twenty-foot radius of the communications device 10 associated with the user 12 can be predetermined and thus associated with the intensity threshold value.

In addition, the communications device 10 determines whether the value of an intensity of the detected sound is less than an intensity value that correlates with gunfire or the sounds of other munitions that are generated by the user 12. In this regard, the communications device 10 determines that the user 12 has fired, for example, her or his own weapon. Because an intensity of the discharging weapon that is carried by the user is so much greater than the intensity of a discharging weapon at any distance from the user 12, the communications device 10 is able to discriminate between gunfire by user 12 and gunfire that is perilous to the user 12.

To further determine whether the detected sound is perilous to the user 12, the communications device 10 generates a query when the value of the intensity level of the detected sound exceeds the intensity threshold value. The query includes at least one of: a beep, a voice prompt, a vibration, communication from the other users 12a, etc. and/or combinations thereof. Regardless of the form of the query, the query prompts the user 12 to confirm whether the detected sound is truly perilous or a false alarm, i.e., initially determined to be perilous but really is not. The voice prompt can ask the user 12 whether he or she is okay. Other forms of the query may indicate the same.

After generating the query, the communications device 10 waits for a response to the query to confirm the nature of the detected sound. The communications device 10 can do no more but wait for the response to the query (i.e., does not timeout). The communications device 10 an also wait for a predetermined period. Because there was no response to the query and after expiration of the predetermined period, the communications device 10 contacts the situational awareness system 44 and/or the other communications device 10a, etc. to indicate that the user 12 is in peril or the communications device 10 is unattended. The user 12 can also answer the query and confirm whether there is a perilous situation or a false alarm, e.g., by clicking the talk control a predetermined number of times. The answer to the query can further be a voice response from the user, etc.

In further aspects of the present teachings, the communications device 10 can automatically (i.e., without prompting by the user 12) transmit the sound detected by the communications device 10 to the other communications devices 10a, etc. and/or the situational awareness system 44. In this regard, other users 12a, etc. and/or personnel 64 (FIG. 6) associated with the situational awareness system 44 can listen to the sound and further judge whether the detected sound is perilous to the user 12, i.e., a remote false alarm determination.

In a further aspect of the present teachings, the communications device 10 is remotely activated to control the microphone 16 to detect further sounds, i.e. the microphone 16 can be remotely opened. In this regard, the microphone 16 listens for further sounds and can transmit the sound to the other communications devices 10a, etc. and/or the situational awareness system 44 for a remote false alarm determination.

Figure 6:
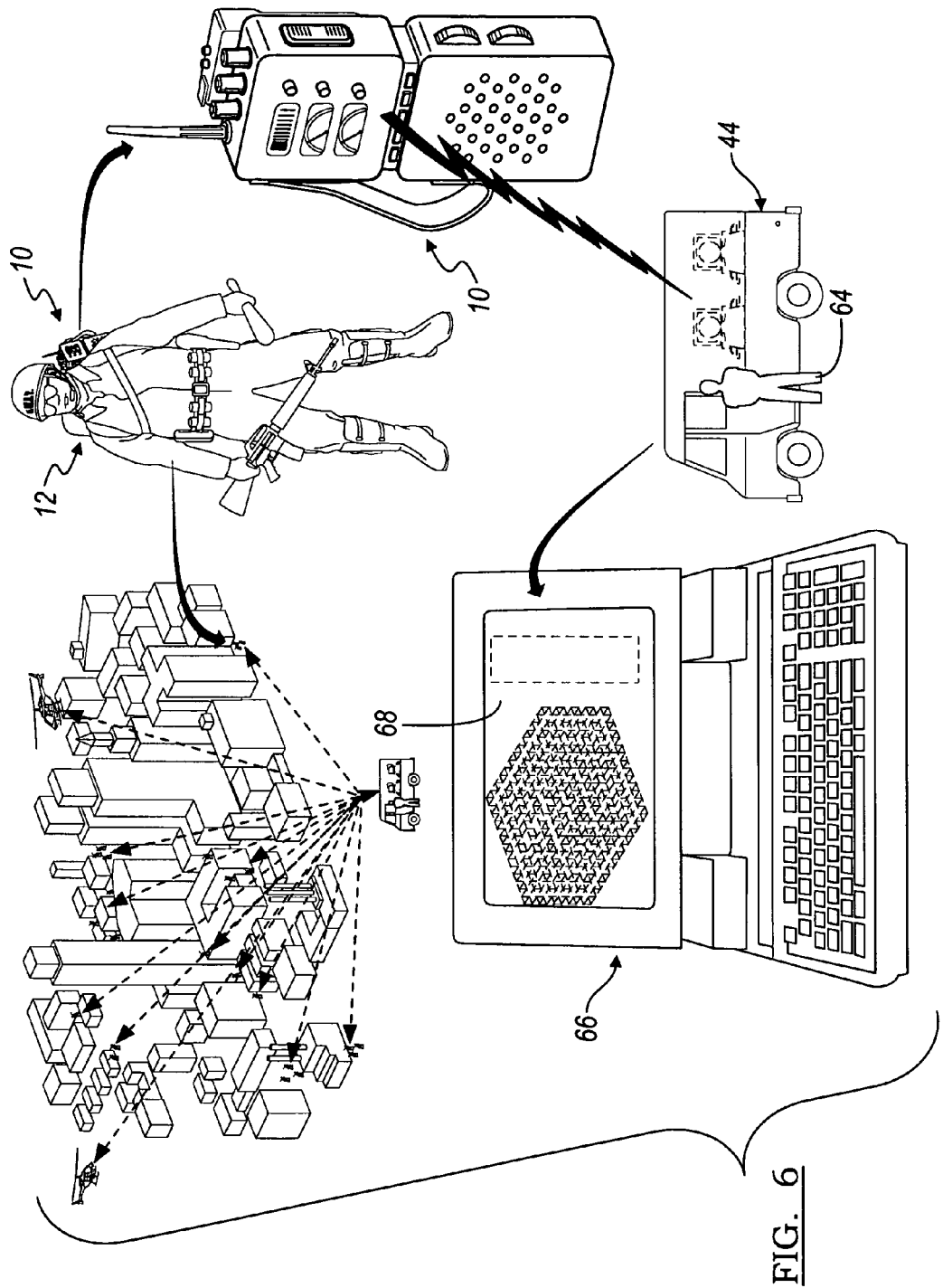
FIG. 6 is a diagram in accordance with the present teachings showing the user, the communications device, the situation awareness system and communication therebetween in the exemplary scenario of FIG. 5.
Figures 7, 7A:
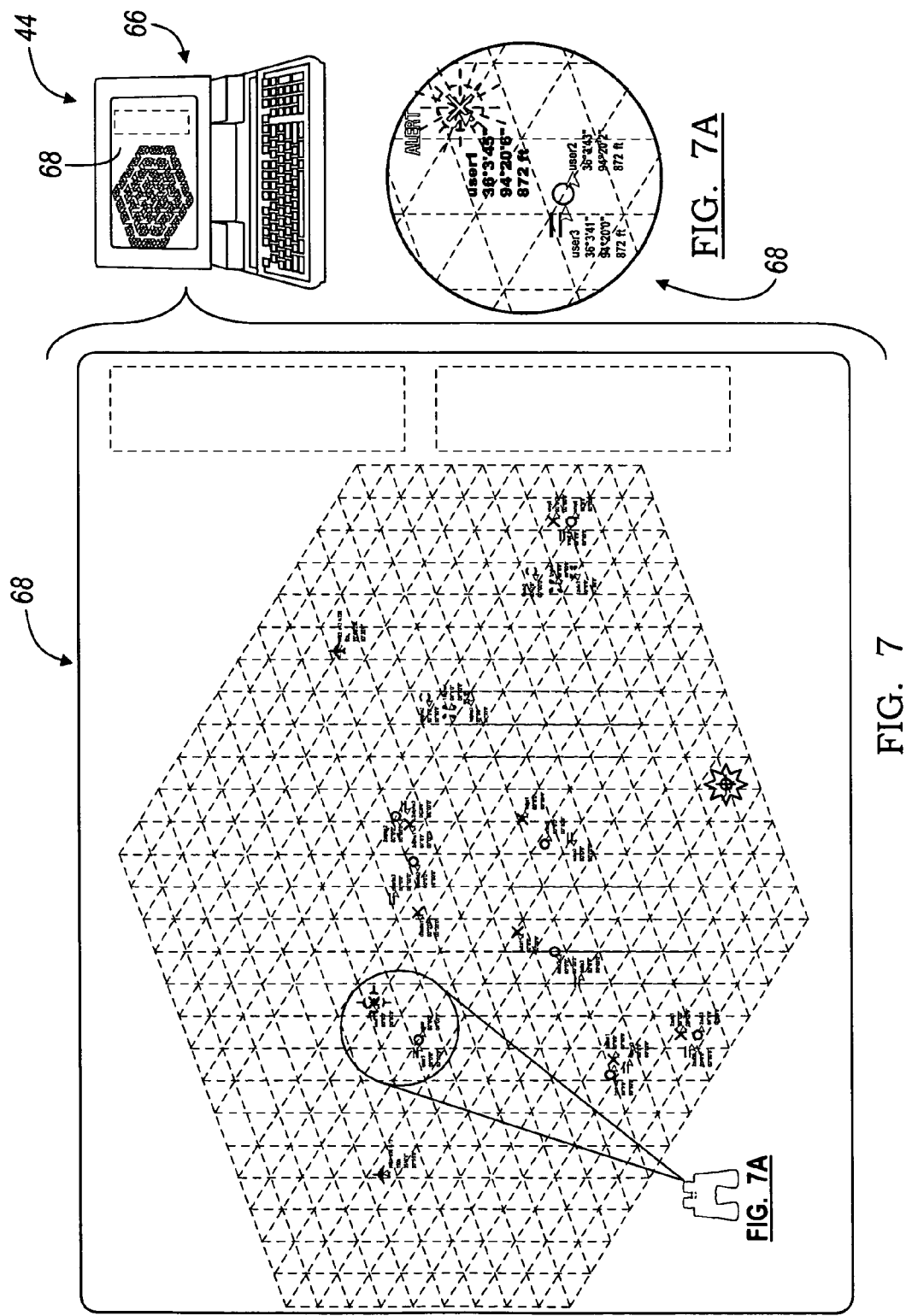
FIG. 7 is a diagram in accordance with the present teachings showing an exemplary image of a display associated with the situational awareness system including positions of users and their situational status.
FIG. 7A is an exploded view of the image of FIG. 7 showing an identity, a status and a position of the user relative to applicable geodetic and topographical information.

With reference to FIGS. 6 and 7 the situational awareness system 44 can receive and track multiple users 12, 12a, 12b, etc. having respective communications devices 10, 10a, 10b, etc. The signal of each communications device 10, 10a etc. can include a situational condition, the position information (e.g., GPS coordinates), the identifier data (e.g., a MAC address of the communications device 10) and/or combinations thereof. The signal can also include at least a portion of the sound (e.g., a three to five second sample). The situational awareness system 44 includes a terminal 66 having a display 68. The terminal 66 can be local to the situational awareness system 44 or connect thereto remotely. The situational awareness system 44 can also define a combination of the terminal 66, the display 68 both of which connect to another communications device.

The situation condition may indicate whether the communications device 10 has determined whether user 12 has confirmed the encounter with the perilous situation or confirmed a false alarm. For example, the user 12 via the interface controls 18 may confirm the existence of the perilous situation. By way of the above example, double clicking the talk control 54 (FIG. 3) may be a way for the user 12 to confirm the perilous situation when queried by the communications device 10. In other examples, the expiration of time may result in an automatic confirmation of the perilous situation without a human response (local or remote) to the query of the communications device 10.

The situation condition can also be determined by the other users 12a, etc. using the other communications devices 10a, etc. based on the detected sound transmitted by the communications device 10. The situational awareness system 44 can also update (and be updated by) the situational condition of the user 12 and/or the other users 12a, etc. based on remote determinations by other users 12a, etc. and/or personnel associated with the situational awareness system 44.

With reference to FIGS. 6, 7 and 7A, the situational awareness 44 system can provide a server based system that determines whether the detected sound. The situational awareness server 44 determines a history of information received from the communications device 10 and/or the other communications device 10a, etc. The history of information can include position information such as a GPS signal providing longitude, latitude and altitude or other relative positional information. Respective unique identifier data can be associated with the historical position information. Current and/or historical information can be displayed by the situational awareness system 44 on, for example, the display 68.

The display 68 displays one or more icons and associated information that may correlate with the users 12, 12a, etc. having respective communications devices 10, 10a, etc. With reference to FIG. 7A, each of the icons can show the situational condition, the historical position information and/or other pertinent information associated with the users 12, 12a, etc. and the respective communications devices 10, 10a etc. The icons can also be displayed relative to associated geodetic, topographical and/or structural information (e.g., building blueprints). Based on the above information, the personnel associated with the situational awareness system 44 can deploy additional forces as needed with (or without) communications devices.

The query may be visual (e.g., blinking light 70 (FIG. 1)), transmitted to an additional earpiece 34 (FIG. 2) or some other relatively quiet form of indication in a situation where silence is paramount. A vibration may also be used to query the user 12 from a remote location such as a wireless vibrating shoe insert 72 (FIG. 1).

The communications device 10, after detection of the perilous situation, can continuously but temporarily transmit the identification data and the position information. The continuous transmission of the above data and information can be for a predetermined period or until deactivated or reset. In one example, the predetermined period can be one hour. The reset may be performed by the user 12 via the communications device 10. The reset may also be received remotely from the other communications devices 10*a*, etc. and/or the situational awareness system 44. During the predetermined period of time, the situational awareness system 44 can track the continuous transmissions of the position information and the identifier data to track the progress and position of the users 12, 12*a*, etc., as shown in FIG. 7. After the predetermined period has expired or by reset, the communications device 10 can reset and return to detecting sounds that may be indicative of the perilous situation. And, when the next sound is determined to be perilous or not via the query, the communications device 10 can transmit the next sound, etc.

In accordance with a further aspect of the present teachings, the remote situational awareness system 44 or other users 12*a*, etc. of the other communications devices 10*a*, etc. may contact the user 12 of the communications device 10 that has detected the perilous sound and remotely activate the speaker 14 on the communications service 10. By activating the speaker 14 remotely, situational awareness system 44 and/or other users 12*a*, etc. may contact the user 12 that has detected the perilous sound and ask them, whether they are okay. Based on the response to that question, the other users 12*a*, etc. and/or the situational awareness system 44 may deploy additional personnel as needed.

In accordance with the various aspects of the present teachings, the communications device 10 may communicate with the one or more of the other users 12*a*, etc. and/or the situational awareness system 44 using a suitable radio frequency. Examples of the radio frequency range may include, but are not limited to, high frequency (i.e., 3 MHz-30 MHz), very high frequency (i.e., 30 MHz-300 MHz) and ultra high frequency (i.e., 300 MHz-3.0 GHz). It will be appreciated that other forms of electromagnetic wave communication may be used between the communications device 10 and other communications devices 10 and/or the situational awareness system 44.

In other aspects of the present teachings, the communications device 10, the other communications device 10*a*, etc. and/or the situational awareness system 44 determines whether the detected sound is initially indicative of the perilous situation by making one or more of the following determinations. In one aspect, the communications device 10 determines whether a value of a duration of the sound is less than a duration threshold value. By way of the above example, the duration of the gunshot can be relatively short when compared to other sounds, e.g., sounds of car traffic. As such, the communications device 10 determines that the gunshot was heard by the communications device 10, when the duration of the sound is less than the duration threshold value.

In further aspects, the communications device 10 determines when one or more values associated with power at one or more frequencies of the sound (i.e., a certain power spectral density) are generally similar to or matching the power at the one or more predetermined frequencies (i.e., a generally matching a predetermined power spectral density) that may be associated with the sounds of one or more perilous situations. It will be appreciated that the power spectral density of the sound produced by the gunshots can be relatively unique compared to other sounds, e.g., the combustion engine backfiring. As such, the communications device 10 initially determines that the gunshot has occurred nearby the user 12 of the communications device 10 when the power spectral density of the detected sound is similar to or generally matches one or more power spectral densities of known perilous sounds.

In further aspects, the communications device 10 determines when one or more values associated with a periodicity of the sound (e.g., repetition from automatic gunfire) are generally similar to one or more predetermined periods that may be associated with the periodicity of one or more sounds from automatic or repeating gunfire that would be indicative of perilous situations. It will be appreciated that the periodicity of the sound produced by repeating gunfire is relatively unique compared to other sounds, e.g., a pneumatic hammer. As such, the communications device 10 initially determines that the repeating gunfire has occurred nearby the user 12 of the communications device 10 when the periodicity of the detected sound is similar to or generally matches one or more repeating sounds of known automatic weapons. A value of the loudness of the sound, in addition to the periodicity of the sound, can be used in determining whether the sound is perilous to user.

The communications device 10 can also determine whether the sound heard by the communications device 10 is a predetermined type of sound. The predetermined types of sound may include the gunshot, an explosion, an impact, the user 12 falling through a floor in a building, other sounds indicative of a perilous situation and/or combinations thereof. Further examples can include explosions that can be produced from concussion waves due to either detonation or natural phenomena.

The communications device 10 can reference a lookup table or other pre-programmed values when determining whether the detected sound is initially indicative of the perilous situation. It will be appreciated that the lookup table may be resident in memory contained in one or more of the modules 20 in the communications device 10 or may be accessed remotely. The communications device 10 can remotely access, for example, other communications devices 10*a*, etc., the situational awareness system 44, the external device 62 (FIG. 3) (e.g., access to memory via a universal serial bus, tape media, wireless drives, optical media, etc.) and/or combinations thereof.

The lookup table may include various suitable characteristics of various types of sounds. Some example characteristics include intensity, duration, frequency, periodicity, power spectral density and combinations thereof. The types of sounds in the lookup table may be perilous or may not be perilous to the user 12. For example, the lookup table can include multiple values of characteristics of sounds produced by explosions, gunshots, or other sounds indicative of the perilous situation. In other examples that may not be perilous, the lookup table may include sounds, such as, backfiring of an internal combustion engine. The communications device 10 may discriminate between perilous and non-perilous sounds by at least referencing a portion of the lookup table and/or the pre-programmed values. The communications device 10 may also determine whether the detected sound is a predetermined type of sound by using the lookup table and/or the preprogrammed values and the values of the intensity, the duration, the power spectral density, other characteristics and/or combinations thereof.

The communications device 10 can make the above applicable determinations based on objective values such as frequency, power, duration and intensity but can also make the above determinations based on more subjective indicators such as loudness, quality, timbre and noise. The subjective indicators, like the objective indicators, may be associated with predetermined values, patterns and/or the lookup table and may be necessarily relative to a position of the listening device. In this regard, the subjective indicators of the sound may be different for sounds analyzed closer to or further from the communications device 10, the situational awareness system 44 and/or other users 12a, etc. of the communications devices 10a, etc. The communications device 10 can therefore make the determination of whether the user 12 is in peril based on the values of subjective and/or objective indicators.

As such, the communications device 10 generates the query when at least the value of the intensity is in excess of the intensity threshold, the value of the duration is less than the duration threshold, the power spectral density generally matches the predetermined power spectral density, the periodicity generally matches the predetermined periodicity, the sound generally matches the predetermined type of sound and/or combinations thereof. Moreover, the above predetermined values, patterns, characteristics, spectra, etc. may be referenced in the lookup table and/or the pre-programmed values.

In one example, the communications device 10 can only consider extremely loud sounds, e.g., in excess of about 150 dB. It will be appreciated that the threshold decibel level indicative of an extremely loud sound may vary depending on the environment in which the communications device 10 will operate and the distance between the source of the sound and the communications device 10. For example, a pistol may expose the shooter to a sound pressure level of about 165 dB. Moreover, an explosion of a grenade may produce a sound pressure level of about 210 dB near the explosion. As such, the communications device 10 may only generate the query when the extremely loud sound is detected. In one example, remote arms fire and explosions (e.g., less than about 140 dB) would not cause the communications device 10 to generate the query.

In accordance with the further aspect of the present teachings, two communications devices 10, 10a, can be used without further communications devices 10b, 10c, etc. and/or the situational awareness system 44. In this regard, the first communications device 10 can detect the perilous situation. The communications device 10 can generate the query to determine whether the sound was otherwise a false alarm. The communications device 10 can also transmit the sound to the second communications device 10a. The second communications device 10a can also control the first communications device 10 to continuously but temporarily listen for the sounds from the second communications device 10a. The second communications device 10a can receive the sound from the first communications device 10 to further assist the user 12 of the first communications device 10 to filter out the false alarm, or determine that the sound is truly from the perilous situation. In addition, the first communications device 10 can transmit to the second communications device 10a the unique identifier data and the position information, so that the second user 12a of the second communications device 10a can receive the position, the identity and whether the user 12 of the first communications device 10 is in peril (i.e., the situational condition).

Various aspects of the present teachings can be incorporated into a walkie-talkie or other such two-way communications device including, but not limited to, vehicle mounted communication devices and base stations. As such, only the software and/or firmware of the device may need to be updated to implement the present teachings. In some instances, some hardware changes may be necessary to provide a continuously signal from the microphone 16. In one example, the update may be performed by flashing or re-flashing certain components, modules, etc. to add and/or change the desired functionality. It will be appreciated that when only the software or the firmware needs to be updated, additional capital investment in new equipment is not needed.

Figure 5:
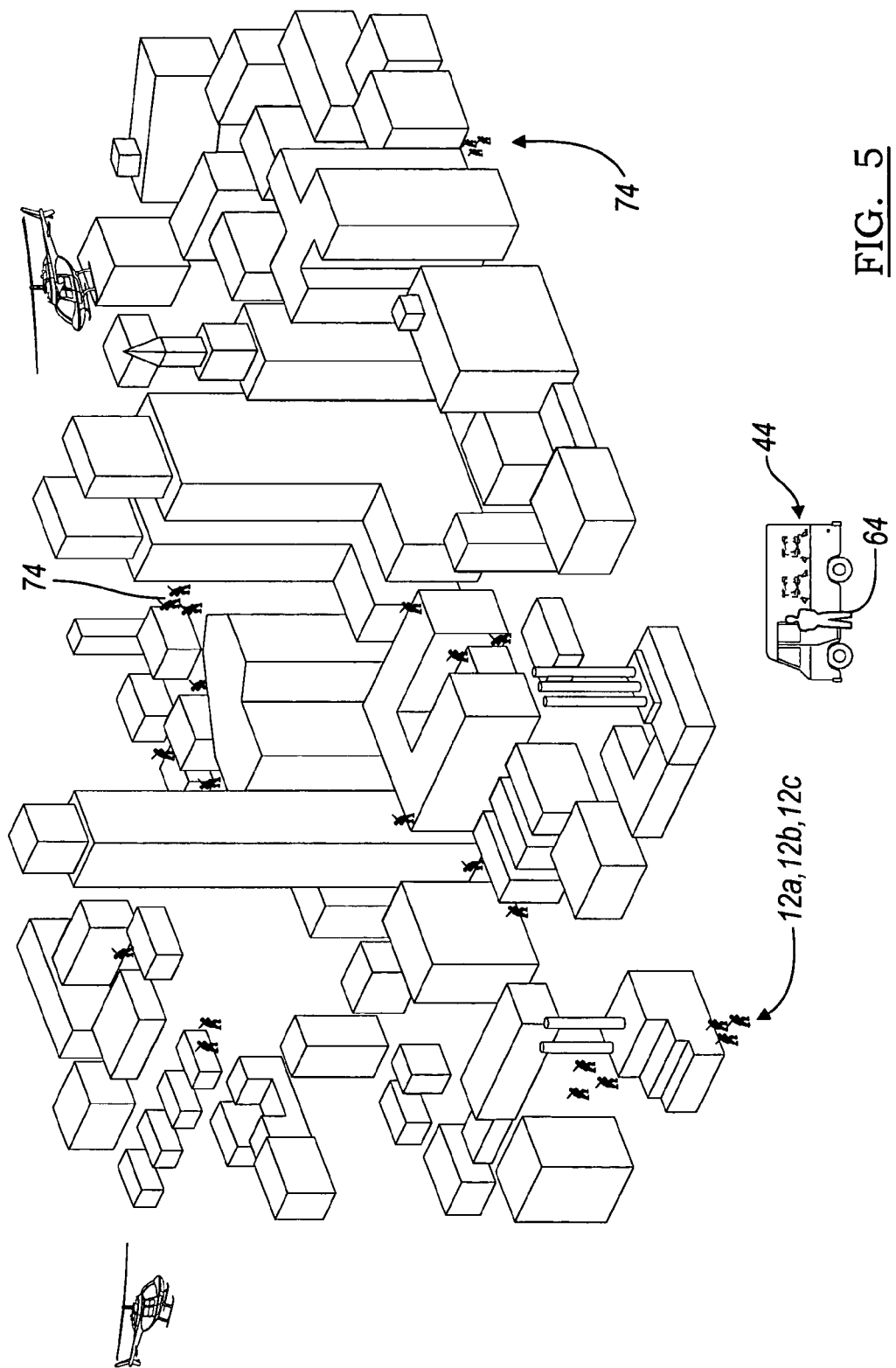
FIG. 5 is a diagram of an exemplary scenario in accordance with the present teachings showing that detection of the perilous situation may benefit the user.

In a further aspect of the present teachings, the communications device 10 and the other communications devices 10a, etc. can provide a moving sensor array 74 in an environment, as illustrated in FIG. 5, where the tracking of status and position of personnel may be beneficial. As the user 12 and the other users 12a, etc. move about the environment, the communications devices 10, 10a, etc. associated with the users 12, 12a etc. can provide a moving listening array that can keep personnel associated with the situational awareness system 44 and the other users 12a, etc. apprised of what is occurring in the environment.

The communications devices 10 and other communications devices 10a, etc. can communicate between one another to provide the array of the communications devices that can detect sounds indicative of the perilous situation. The array of communications devices move with the respective users to provide the moving array. The position and status of each communications device 10 in the moving array can be tracked by the situational awareness system 44, as shown in FIG. 7.

While specific aspects have been described in the specification and illustrated in the drawings, it will be understood by those skilled in the art that various changes may be made and equivalence may be substituted for elements thereof without departing from the scope of the present teachings, as defined in the claims. Furthermore, the mixing and matching of features, elements and/or functions between various aspects of the present teachings may be expressly contemplated herein so that one skilled in the art will appreciate from the present teachings that features, elements and/or functions of one aspect may be incorporated into another aspect, as appropriate, unless described otherwise above. Moreover, many modifications may be made to adapt a particular situation, configuration or material to the present teachings without departing from the essential scope thereof. Therefore, it may be intended that the present teachings not be limited to the particular aspects illustrated by the drawings and described in the specification as the best mode presently contemplated for carrying out the present teachings, but that the scope of the present teachings will include many aspects and examples following within the foregoing description and the appended claims.

What is claimed is:

1. A method for determining whether a user having a communications device has encountered a perilous situation, the method comprising:

detecting a sound with the communications device;

determining by the communication device whether said sound is indicative of the perilous situation;

generating a query of the user soley by the communications device when said sound is determined to be indicative of the perilous situation;

querying the user of the communication device for an input to the communication device with a non-audible prompt output by the communication device;

receiving an input to the communication device from the user in response to the query; and transmitting a signal from the communications device when the communication device does not receive an input from the user within a period of time after querying the user.

2. The method of claim 1 wherein said sound is determined to be indicative of the perilous situation when the communications device determines a value of an intensity of said sound is greater than an intensity threshold.

3. The method of claim 1 wherein said sound is determined to be indicative of the perilous situation when the communications device determines one of a value of a duration of said sound is less than a duration threshold, whether said sound generally matches a predetermined type of sound, whether a power spectral density of said sound generally matches a predetermined power spectral density, whether a periodicity of said sound generally matches a predetermined periodicity and combinations thereof.

4. The method of claim 1 wherein said query includes one of a voice prompt, a change in tone, a change in vibration, a change in light, a text prompt, a communication from another user, a communication from a situational awareness system and combinations thereof.

5. The method of claim 1 further comprising transmitting a signal from the communications device based on a result of said waiting for said response from the user, wherein said signal includes information selected from a group consisting of a sample of said sound, identifier data associated with the communications device, position information of the communications device, a situational condition based on said response and combinations thereof.

6. A method for determining whether users are in a perilous situation by listening for sounds with communications devices associated with the respective users, the method comprising:
determining by the communications device a value of a characteristic descriptive of the sounds detected;
comparing said value of said characteristic with a threshold value associated with said characteristic;
querying a user of the first communications device with a non-audible prompt output by the first communications device based on said comparing;
receiving an input to the first communication device from the user in response to the query, thereby confirming a perilous situation; and
transmitting a signal from the first communications device when the first communication device does not receive an input from the user within a period of time after querying the user.

7. The method of claim 6 further comprising
receiving a sample of the sounds detected by said first communications device with a second communications device,
reviewing said sample of the sounds from said second communications device to confirm the perilous situation or confirm a false alarm and
sending said response to said query based on said sample of the sounds.

8. The method of claim 7 wherein said second communications device is associated with a situational awareness system.

9. The method of claim 6 further comprising transmitting a signal from said first communications device based on a result of said waiting for said response or lack thereof, wherein said signal includes information selected from a group consisting of a sample of the sounds, identifier data associated with said first communications device, position information of said first communications device, a battery level, a situational condition based on said response and combinations thereof.

10. The method of claim 6 wherein said determining said value of said characteristic descriptive of the sounds includes one of whether a value of an intensity of the sounds is greater than an intensity threshold, whether a value of a duration of the sounds is less than a duration threshold, whether the sounds generally match predetermined types of sounds, whether a power spectral density of the sounds generally matches a predetermined power spectral density and combinations thereof.

11. The method of claim 6 further comprising determining said threshold value associated with said characteristic by referencing a lookup table, said value based on one of a gunshot, an explosion, an impact, a structural failure and combinations thereof.

12. The method of claim 6 further comprising determining said threshold value associated with said characteristic by referencing a pre-programmed threshold value.

13. The method of claim 6 further comprising listening for sounds from a plurality of communications devices, wherein said plurality of communications devices is capable of being in motion and providing a moving listening array.

14. The method of claim 7 wherein said second communications device controls said first communications device to temporarily listen for the sounds.

15. The method of claim 6 further comprising tracking a plurality of signals received by the communications devices, wherein each of said signals includes position information of a sound of each of said signals and identifier information of said source.

16. The method of claim 14 further comprising deploying personnel based on said tracking of said plurality of signals.

17. A communications device for determining whether a user is in a perilous situation, the communications device comprising:
a microphone;
an output device;
a control module that receives a sound from said microphone and determines whether a value of an intensity of said sound is about greater than an intensity threshold, said control module generates a non-audible query of the user using the output device when said value of said intensity of said sound is greater than said intensity threshold and confirms absence presence of a perilous situation upon receiving an input to the communications device from the user in response to the query; and
a transmitter in data communication with the control module that transmits a signal from the device when the user fails to respond to the query within a predetermined period of time after the query.

18. The communications device of claim 17 further comprising an antenna, wherein said control module transmits a signal via said antenna based on a result of said waiting for said response and wherein said signal includes information selected from a group consisting of a portion of said sound, identifier data associated with a source of said signal, position information of said source, a battery level, a situational condition and combinations thereof.

19. The communications device of claim 17 wherein a response to said query originates from one of the user, a situational awareness system that receives said signal, one or more other communications devices that receive said signal and combinations thereof.

20. The method of claim 1 further comprises querying the user with a visual prompt output by the device.

* * * * *